United States Patent [19]

Navato

[11] 4,030,482
[45] June 21, 1977

[54] CONTACT FEVER THERMOMETER

[75] Inventor: José Miguel Antonio Rosario Navato, Manchester, Mo.

[73] Assignee: Lake St. Louis Research Products, Inc., Lake St. Louis, Mo.

[22] Filed: Nov. 20, 1975

[21] Appl. No.: 633,813

[52] U.S. Cl. .................................. 128/2 H; 73/356
[51] Int. Cl.² .......................................... A61B 10/00
[58] Field of Search .................... 128/2 H; 73/356; 23/230 LC

[56] References Cited

UNITED STATES PATENTS

| | | | |
|---|---|---|---|
| 3,561,269 | 2/1971 | Seitz | 73/356 |
| 3,620,889 | 11/1971 | Baltzer | 128/2 H X |
| 3,661,142 | 5/1972 | Flam | 128/2 H |
| 3,871,232 | 3/1975 | Pickett et al. | 73/356 |
| 3,878,722 | 4/1975 | Crites | 73/356 |
| 3,898,354 | 8/1975 | Parker | 73/356 X |

*Primary Examiner*—Kyle L. Howell
*Attorney, Agent, or Firm*—Koenig, Senniger, Powers and Leavitt

[57] ABSTRACT

A contact fever thermometer adapted to be applied to a patient's skin to visually indicate the patient's temperature comprising a substantially rigid substrate having adhesive applied to one face thereof for adhering the substrate to the skin. The substrate is so sized that when the rigid substrate is adhered to the skin, the skin conforms generally to the shape of the substrate. A dark background is applied to the other face of the substrate and a plurality of numerical displays is provided on the dark background, each numerical display being comprised of a layer of liquid crystals which change color in response to changes in temperature within a specified temperature range with the liquid crystals in each of the numerical display areas being adapted to change color in response to changes in temperature within a different temperature range than do the liquid crystals in the other display areas whereby when the thermometer is applied to the skin, one of the numerical display areas displays a most clearly visible numerical temperature thereby indicating the average temperature beneath the substrate.

11 Claims, 5 Drawing Figures

U.S. Patent
June 21, 1977
4,030,482
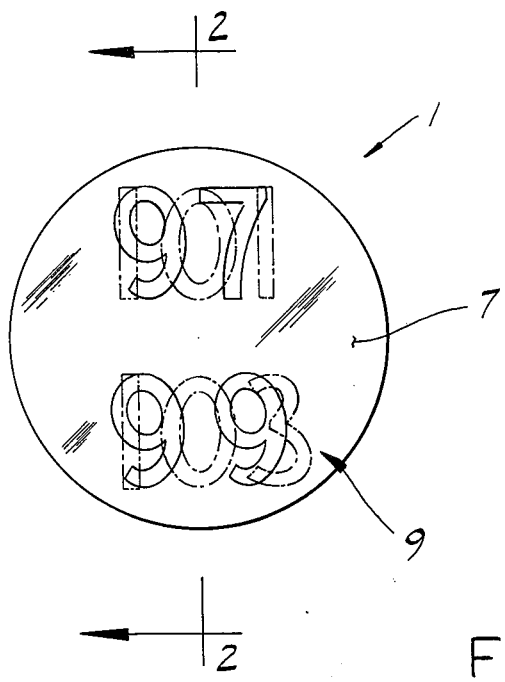
FIG.1
FIG.2
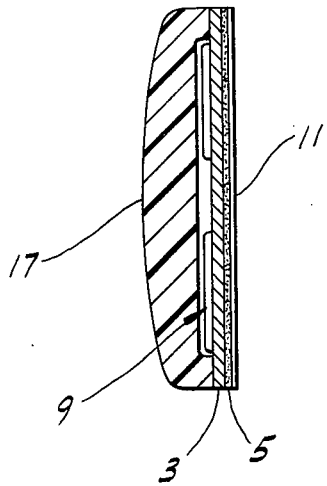
FIG.3
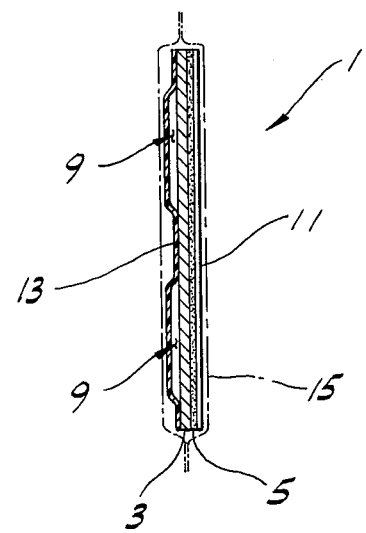
FIG.5
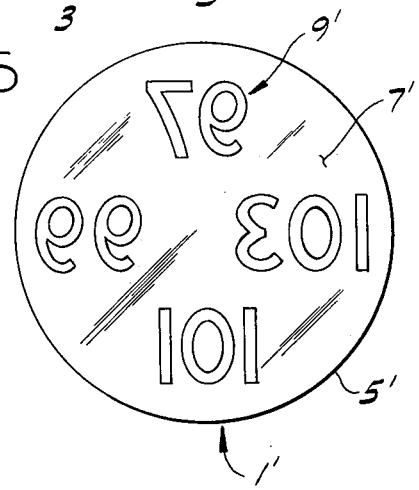
FIG.4

CONTACT FEVER THERMOMETER

BACKGROUND OF THE INVENTION

This invention relates to a contact thermometer, and more particularly to such a thermometer which may be adhesively applied to the patient's body and which readily indicates the patient's temperature.

Known temperature sensors utilize layers of encapsulated liquid crystals which change colors in response to changes in temperature within a predetermined temperature range to indicate the skin temperature of the patient. Typically, these known temperature sensors utilize a flexible backing of plastic film or the like with a pressure sensitive adhesive applied thereto so that the sensor may be readily adhered to and conform to the patient's skin.

Sectors or other areas of the backing have different formulations of encapsulated liquid crystals applied thereto which indicate the patient's temperature over a specified range. However, upon flexing of the plastic film backing, the layers of the encapsulated liquid crystals often come loose from the backing or they may be otherwise damaged by the flexing. Furthermore, the limp plastic film backing offers poor heat conduction and thus if the temperature sensor is applied to various parts of the body having different surface temperatures (e.g., if part of the sensor is applied to the skin over an artery), the indicated temperature may vary considerably across the temperature sensor.

Reference may be made to such U.S. Pat. Nos. 3,561,269 and 3,661,142 for disclosure of digital thermometers in the same general field as this invention.

SUMMARY OF THE INVENTION

Among the several objects of this invention may be noted the provision of a contact thermometer such as above-described, which is of relatively small size so as to be comfortable and unobtrusive when worn, and which readily displays the indicated temperature; the provision of such a thermometer which accurately indicates the average temperature of the tissue to which it is applied; the provision of such a thermometer which may be correlated to display the patient's body temperature which corresponds to the tissue temperature immediately beneath the thermometer; the provision of such a thermometer which has a relatively long shelf life and which is not substantially affected by ultra-violet radiation or by ambient humidity; and the provision of such a thermometer which is inexpensive to manufacture and which may be manufactured using conventional methods and materials. Other objects and features of this invention will be in part apparent and in part pointed out hereinafter.

Briefly, a thermometer of this invention is adapted to be applied to the skin of the human body to visually indicate the temperature of the tissue immediately beneath the thermometer. The thermometer comprises a substantially rigid substrate and adhesive applied to one face of the substrate for adhering the substrate to the skin. The substrate is so sized that when it is adhered to the skin the skin conforms generally to the shape of the substrate. A dark background is applied on the other face of the substrate, and a plurality of numerical display areas are provided on the dark background, each of the numerical display areas being comprised of a layer of liquid crystals which change colors in response to changes in temperature within a specified temperature range with the liquid crystals in each of the numerical display areas being adapted to change color in response to changes in temperature within a different temperature range than do the liquid crystals in the other display areas whereby when the thermometer is applied to the skin, one of the numerical display areas displays a most clearly visible numerical temperature thereby indicating the average temperature of the tissue beneath the substrate.

BRIEF DESCRIPTION OF THE DRAWINGS

FIG. 1 is an enlarged plan view of the contact thermometer of this invention illustrating numerical displays of encapsulated liquid crystals printed on a substantially rigid substrate with different numerical displays being superimposed on one another;

FIG. 2 is a cross-sectional view taken on line 2—2 of FIG. 1;

FIG. 3 is a cross-sectional view similar to FIG. 2 showing a magnifying lens applied to the substrate for facilitating reading of the numerical displays;

FIG. 4 is a graph showing the wave length of light reflected from a typical formulation of encapsulated liquid crystal as a function of temperature; and FIG. 5 is an enlarged plan view of another embodiment of a thermometer of this invention in which the numerical displays are applied backward so as to enable a patient to readily read his temperature by viewing the thermometer in a mirror.

Corresponding reference characters indicate corresponding parts thoughout the several views of the drawings.

DESCRIPTION OF THE PREFERRED EMBODIMENTS

Referring now to the drawings, a contact thermometer of this invention (which also may be referred to as a temperature sensing and display patch) is indicated in its entirety at 1, and it is shown to be adapted for application to the skin of the human body so as to visually indicate the temperature of the tissue immediately behind the patch. The thermometer comprises a substantially rigid substrate 3 having a coating of adhesive 5 applied to one face thereof for adhering the substrate to the patient's skin and to form a good heat transfer path between the skin and the substrate. Preferably, the substrate is so sized (e.g., it may be a circular disk about ½ or 1.2 cm. in diameter) and is sufficiently rigid so that when it is applied to the skin, the skin conforms to the shape (i.e., to the flatness) of the substrate. A dark background 7, preferably a flat black background, is applied to the other face of the substrate. A plurality of numerical displays, as generally indicated at 9, is applied to this above-mentioned background on the other face of the substrate.

More particularly, each numerical display 9 is shown to be one or more numerical digits each of which is of a layer of liquid crystals which change color in response to changes in temperature within a specified temperature range. Each numerical display 9 has different numerical digits (e.g., 97, 99, 101, 103) for indicating different temperatures. The liquid crystals in each of the areas 9 is adapted to change color in response to changes in temperature within a different temperature range than do the liquid crystals in the other display areas whereby when the thermometer is applied to the skin, one of the areas 9 displays a most clearly visible numerical reading of temperature when illuminated with white light thereby indicating the temperature of the tissue beneath the thermometer.

Preferably, substrate 3 is of a rigid piece of heavy metal foil or of thin gauge sheet metal of sufficient thickness in relation to its diameter so as to be substantially rigid when handled and when applied to the skin. The substrate desirably should be of a metal, such as aluminum, having a relatively high coefficient of thermal conductivity so that the substrate will assume a uniform temperature when applied to the skin, this temperature corresponding to the average temperature of the tissue immediately behind the skin. For example, if the thermometer is adhered to the skin in a location which has a relatively high local temperature, such as over an artery or the like, the substrate will more nearly approximate the patient's average body temperature.

Adhesive 5 may be any pressure-sensitve adhesive which may be safely applied to the human skin. One such adhesive is commerically available from the 3M Company of Minneapolis, Minn. under the trade designation "Blue Glue." As indicated at 11, a removable backing strip is applied to the adhesive to protect it, as is conventional. This strip may be peeled off prior to applying the patch to the skin.

Background 7 may be applied to substrate 3 in any conventional manner and may be of any suitable material, such as paint or ink. Preferably, the coating is as thin as possible so as not thermally insulate numerical displays 9 from the substrate. Also, the background is preferably a flat black color. In one instance, flat black epoxy paint commercially available from Pactra Industries of Los Angeles, Calif. under their trade designation "Super Epoxy, ES-11," sprayed on the substrate has been successfully used for the background.

The liquid crystals of which numerical displays 9 are formed are preferably encapsulated liquid crystals (ELC), such as are commerically available from NCR Capsular Products, Miamisburg, Ohio, under the trade designation "Chameleon" and are described in an NCR technical bulletin entitled "Chameleon." These liquid crystals are generally thermotropic liquid crystals and more particularly are cholesteryl nonanoate which possesses the molecular geometry required to form a liquid crystal mesophase. This material exhibits the anisotropic (having optical direction) properties of crystalline solids. As a result of the unique structure of the phase, irridescent colors are observed in the material when it is at a predetermined temperature and is illuminated with white light. Various cholesteric liquid crystal systems can be formulated to respond to predetermined temperature ranges by passing sequentially through the visual spectrum from red to violet. These various liquid crystal formulations are commerically available and are typically an emulsified mixture with particles of the liquid crystal encapsulated in small gelatin capsules nominally having diameters ranging between 2 to 50 microns. These encapsulated liquid crystals are typically supplied as a water-based slurry and may be applied to the substrate by brushing, spraying or by silk screen printing methods.

As is shown in FIG. 4, a typical ELC formulation will reflect white light of different wave length or color as the ELC is heated through its predetermined temperature range. As shown in FIG. 4, at temperatures below a minimum threshold temperature (37° C), the ELC will appear to be black and as it is heated through this minimum threshold temperature it will begin to reflect red light. Upon further heating of the ELC it will sequentially reflect yellow, green and blue light until at a maximum threshold temperature (38.5° C) the ELC again appears to be black. The range between the minimum and maximum threshold temperature may be referred to as the color play temperature and the nominal temperature for the ELC formulation is generally the intermediate temperature at which the particular ELC formulation reflects green light. ELC formulations are commerically available having predetermined color play ranges which may vary from fractions of a degree centigrade to multiple degree ranges and which can function from temperatures as low as −20° to +250° C. Here, we are most concerned with temperature ranges from approximately 35°–41° C., a typical range of temperatures for the human body. For thermometer 1 as illustrated in FIG. 1, four different ELC formulations have been selected, one for each of the display areas 9. Each of these formulations has an intermediate or nominal temperature different from the others. For example, the four displays shown in FIG. 1 may have a color play range of 1.5° C., plus or minus 0.5° C. from the minimum to maximum threshold temperature. As is shown in FIG. 1, the 97° and 101° displays are superimposed and the 99° and 103° displays are superimposed. It will be understood that at any given temperature within the intended operating range of the temperature sensor of this invention (i.e., between 35.5° – 40° C or 96° –104° F.) that only one of the temperature displays will be most clearly visible (i.e., only one of the displays will appear to be green or yellow when illuminated with white light) thereby clearly indicating the temperature of the patient. By superimposing the displays and by making the display numerical, a greater number of temperature sensing areas may be applied to a relatively small substrate and yet the temperature indicated may be accurately determined.

As indicated at 13, a clear overcoat of transparent material is applied over numerical displays 9 to serve as a barrier to isolate the displays from ambient humidity. For example, this overcoat may be a water soluble acrylic spray or a clear lacquer. If a clear lacquer is used, it may be desirable to first apply a water soluble, transparent coating (not shown), such as a water soluble glue commerically available under the registered trademark "Elmer's Glue" from Borden chemical Company thereby to prevent the solvent in the lacquer from attacking the background and the encapsulated liquid crystal.

As is shown in phantom in FIG. 2, a hermetically sealed envelope or package 15 surrounds the patch prior to use. This envelope may be of a heat-sealable plastic film or the like sealed around its edges so as to prevent damage to the encapsulated liquid crystal from moisture. Also, prior to having overcoat 13 applied to the numerical displays 9, the ELC may be coated with an agent, such as para aminobenzoic acid to block ultraviolet radiation from the encapsulated liquid crystals.

The numerical displays 9 may be correlated to the patient's body or oral temperature so that rather than indicating the skin or tissue temperature immediately behind the thermometer, the patient's body temperature is indicated. Generally, body temperature correlates with skin temperature at known locations on the body and thus when a thermometer 1 of this invention is applied to this known location (e.g., to the patient's temple) and when numerical display is most visible, the numerical display will read out the patient's true body temperature. For example, a skin temperature at a particular location on the body of 36.6° (98° F.) may correspond to a body temperature of 37.7° C (100° F.).

As is shown in FIG. 3, a magnifying lens 17 of clear plastic or the like may be applied (i.e., bonded) to the front face of the thermometer to magnify display areas 9 thereby to make them easier to read. This may be especially helpful on smaller thermometers using a greater number of display areas 9 than is shown in FIG. 1.

As indicated at 1' in FIG. 5, another embodiment of the thermometer of this invention is shown in which display areas 9" are applied backward to substrate 5'. This enables a patient to whom the thermometer is applied to readily read his own temperature by viewing the thermometer in a mirror.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A contact fever thermometer adapted to be applied to the skin of the human body to visually indicate the temperature of the tissue immediately beneath the thermometer comprising a substantially rigid metal substrate, adhesive applied to one face of the substrate for adhering the substrate to the skin, said substrate being a substantially flat member having a length and a width of ½ inch or less so that when it is adhered to the skin the skin conforms generally to the shape of the substrate thereby to insure good thermal contact between the skin and the substrate so that the substrate substantially assumes the average temperature of the tissue to which it is adhered, a dark background on the other face of the substrate, and a plurality of numerical display areas on said dark background, each of said numerical display areas being comprised of a layer of liquid crystals which change color in response to changes in temperature within a specified temperature range with the liquid crystals in each of said numerical display areas being adapted to change color in response to changes in temperature within a different temperature range than do the liquid crystals in the other display areas whereby when said thermometer is applied to the skin, one of said numerical display areas displays a most clearly visible numerical temperature thereby indicating the average temperature of the tissue beneath the substrate, each of said layers of liquid crystals forming said numerical display areas being initially of a color substantially the same as said background at temperatures below a minimum threshold temperature and above a maximum threshold temperature, the span of temperatures between said minimum and maximum threshold temperatures constituting said range of temperatures, two of said display areas being in superimposed relation with one another on said substrate with the maximum threshold temperature of one of said superimposed numerical display areas being below the minimum threshold temperature of the other of said superimposed numerical display areas whereby only one of the superimposed numerical display areas is visible at one time.

2. A contact fever thermometer as set forth in claim 1 wherein said background is black, and wherein said thermometer further comprises a transparent protective covering applied over said numerical display areas for protecting said liquid crystals from moisture.

3. A contact fever thermometer as set forth in claim 2 wherein said protective coating is a lacquer, said thermometer further comprising a barrier applied over said background and over said numerical display areas prior to applying said lacquer for protecting said background and said numerical display areas from said lacquer.

4. A contact fever thermometer as set forth in claim 1 wherein said numerical displays are applied backward on said substrate so that a patient having said thermometer applied to his body may readily read the most clearly visible numerical temperature by viewing the thermometer in a mirror.

5. A contact fever thermometer as set forth in claim 1 further having a coating over said display areas for substantially blocking ultraviolet radiation from said liquid crystals.

6. A contact fever thermometer as set forth in claim 1 further having a lens on said other face of said substrate for magnifying said display areas thereby to make them more readable.

7. A contact fever thermometer as set forth in claim 1 wherein nonconsecutive numerical displays are superimposed one on another so that consecutive displays are located remotely from one another on said substrate thereby to facilitate reading of said numerical displays.

8. A contact fever thermometer adapted to be applied to the skin of a human body to visually indicate body temperature comprising a substantially rigid metal substrate, adhesive applied to one face of the substrate for adhering the substrate to the skin, said substrate being a substantially flat member having a length and width of ½ inch or less and being so sized that when it is adhered to the skin the skin conforms generally to the shape of the substrate, a dark background on the other face of the substrate, and a plurality of visual temperature display areas applied to said dark background, each of said display areas comprising one or more numerical digits of a layer of encapsulated liquid crystals which change color in response to changes in temperature within a specified temperature range, each of said display areas of encapsulated liquid crystals being of a color substantially the same as the background at a temperature below the minimum threshold temperature and above a maximum threshold temperature and being of a color contrasting with said background when at an intermediate temperature between said minimum and maximum threshold temperatures, said numerical digits of said display areas indicating the body temperature and being correlated to the tissue temperature immediately beneath said thermometer so that when said intermediate temperature of one of said display areas becomes visible, the body temperature may be read which corresponds to the tissue temperature beneath said thermometer.

9. A contact fever thermometer for ascertaining the temperature of the human body, said thermometer comprising:
   a substrate;
   means for adhering the substrate to the skin of the human body with one surface of the substrate substantially against the skin so that the temperature of the substrate will be essentially the same as the temperature of the skin; and a plurality of display areas on the opposite surface of the substrate, each display area being in a configuration of a different numeral and including liquid crystals which change color in response to changes in temperature within a specified temperature range, having minimum and maximum threshold temperatures and a nominal temperature intermediate the threshold temperatures, the nominal temperature of the liquid crystals for various display areas corresponding to the magnitude of the numerals of the display areas so that the crystals of the display area for the lowest numeral will have the lowest nominal temperature and the crystals for the display area for the highest numeral will have the highest nominal temperature, at least one of the display areas being superimposed on another of the display areas, the numerals of the superimposed display areas not being successive so that at least one numeral intermediate the numerals of the superimposed display areas exists on the substrate remote from the superimposed display areas.

10. A contact fever thermometer as set forth in claim 9, wherein the nominal temperatures for the liquid crystals for various display areas are different from the numerals of the display areas, the differences being the variation between skin temperature and body temperature, whereby the readings provided by the thermometer reflect actual body temperature 11. A contact skin thermometer as set forth in claim 9, wherein the substrate is a disk which has a width no greater than about ½ inch.

* * * * *